US012282475B2

(12) United States Patent
Subramanian et al.

(10) Patent No.: US 12,282,475 B2
(45) Date of Patent: Apr. 22, 2025

(54) MULTI-THREADED DYNAMIC QUERIES ON AN UNPARTITIONED DATABASE

(71) Applicant: salesforce.com, inc., San Francisco, CA (US)

(72) Inventors: Karthik Mohan Subramanian, San Francisco, CA (US); Varun Mohta, San Francisco, CA (US); Ted Liu, San Francisco, CA (US); Yeshwant Sai Madanagopal, San Francisco, CA (US); Jeffrey Zoch, San Francisco, CA (US); Bo Xia, Vienna, VA (US)

(73) Assignee: Salesforce, Inc., San Francisco, CA (US)

( * ) Notice: Subject to any disclaimer, the term of this patent is extended or adjusted under 35 U.S.C. 154(b) by 83 days.

(21) Appl. No.: 17/527,559

(22) Filed: Nov. 16, 2021

(65) Prior Publication Data
US 2023/0153293 A1 May 18, 2023

(51) Int. Cl.
*G06F 16/23* (2019.01)
*G06F 16/2453* (2019.01)

(52) U.S. Cl.
CPC .... *G06F 16/2379* (2019.01); *G06F 16/24532* (2019.01)

(58) Field of Classification Search
CPC ............ G06F 16/2379; G06F 16/24532
See application file for complete search history.

(56) References Cited

U.S. PATENT DOCUMENTS

| | | | | |
|---|---|---|---|---|
| 6,526,435 B1* | 2/2003 | Lippert | ............... | G06F 16/957 707/999.005 |
| 9,898,504 B1* | 2/2018 | Pedhazur | ............ | G06F 16/2452 |
| 10,922,053 B2* | 2/2021 | Harada | ............... | G06F 16/2471 |
| 11,075,984 B1* | 7/2021 | Mercier | ................. | H04L 43/20 |
| 2011/0047144 A1* | 2/2011 | Han | ................ | G06F 16/24532 707/718 |
| 2020/0356538 A1* | 11/2020 | Liu | ..................... | G06F 12/1072 |

FOREIGN PATENT DOCUMENTS

WO WO-2021184031 A2 * 9/2021

* cited by examiner

*Primary Examiner* — Ann J Lo
*Assistant Examiner* — Fernando M Mari Valcarcel
(74) *Attorney, Agent, or Firm* — Butzel Long

(57) ABSTRACT

Systems, devices, and techniques are disclosed for multi-threaded dynamic queries on an unpartitioned database. An instruction to perform a database operation on rows of a database may be received. Processing threads may be generated by generating three random numbers. A starting point of a processing thread may be set to a first random number, an offset may be set to a second random number, and an order may be based on a third random number. The processing threads may each generate a dynamic query. A dynamic query generated by a processing thread may include an instruction to perform the database operation on rows of the database based on the offset, starting point, and order for the processing thread. Each dynamic query may be run against the database to perform the database operation.

17 Claims, 9 Drawing Sheets

MULTI-THREADED DYNAMIC QUERIES ON AN UNPARTITIONED DATABASE

BACKGROUND

In a multi-threaded database environment, when different threads need to retrieve different rows of a database to perform operations, the database may be partitioned on a column and each thread may be assigned the partition of the database that includes the rows that thread needs. This may prevent collisions, as each thread will have its own distinct partition of the database to work with. However, partitioning a database can result in database downtime, making the database temporarily unavailable for other operations. Database downtime may be costly to any organization that uses the database.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
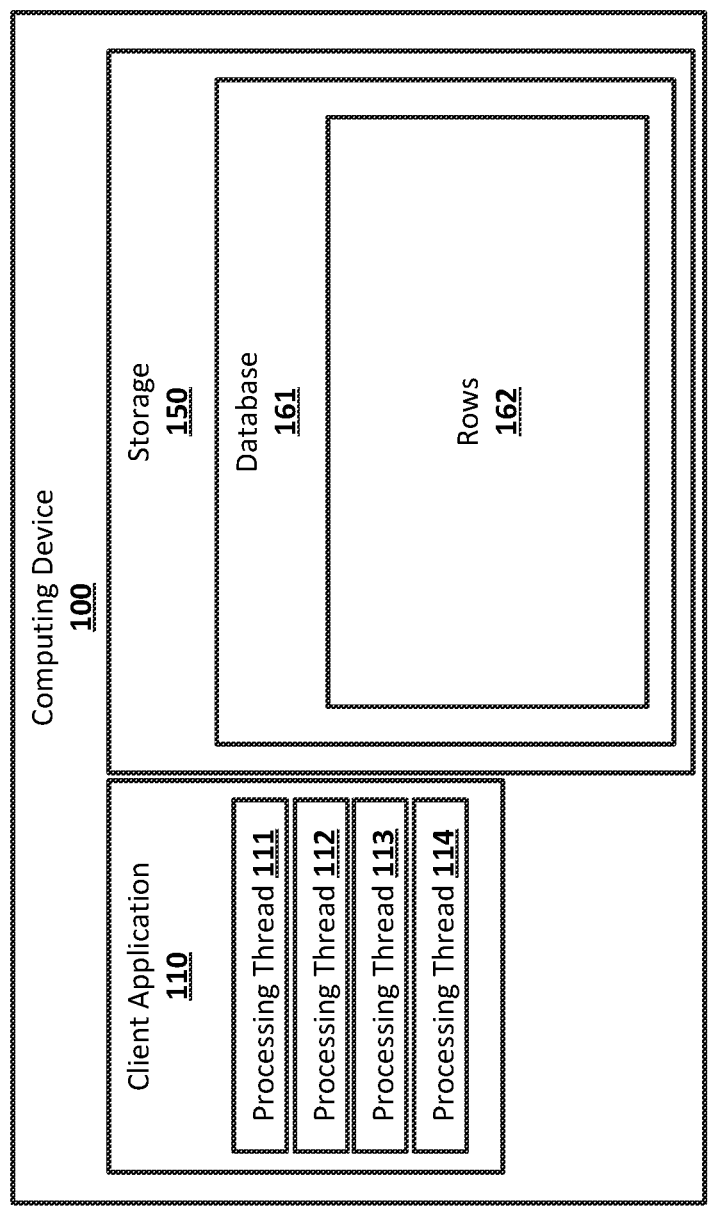
FIG. 1 shows an example system suitable for multi-threaded dynamic queries on an unpartitioned database according to an implementation of the disclosed subject matter.

Techniques disclosed herein enable multi-threaded dynamic queries on an unpartitioned database, which may allow for multiple processing threads to operate safely on a database without partitioning the database. An instruction to perform a database operation on multiple rows of a database may be received. Multiple processing threads may be generated. Three random numbers may be generated for each of the multiple processing threads. The first random number generated for a processing thread may be used to set the starting point for that processing thread. The second random number generated for a processing thread may be used as an offset for that processing thread. The third random number generated for a processing thread may be used to determine an order for that processing thread. The processing threads may generate dynamic queries to be run against the database. A dynamic query generated by a processing thread may include instructions to perform the database operation on rows of the database that are part of the number of rows of the database based on the offset of the processing thread, located in a direction indicated by the order of the processing thread, and starting at a row indicated by the starting point of the processing thread. The dynamic queries may be run against the database to perform the database operations.

An instruction to perform a database operation on multiple rows of a database may be received. The instruction to perform the database operation may be received at a client application for the database. The instruction may be input by a user using the client application or in any suitable manner, such as, for example, as a task that runs on a timer or in response to any suitable event. The database operation may be an idempotent database operation that may be safely performed multiple times on the same row of a database. For example, the database operation may be a delete operation, or may be an operation that sets a cell of a specified column to a specified value. The instruction may specify any conditions on the performance of the database operation. The conditions may be specified in any suitable manner, and may, for example, indicate which rows of the database the database operation should be performed on. The conditions may include, for example, identifying rows individually, as parts of ranges of rows, or based on the rows storing specified values in specified columns. For example, an instruction to perform a database operation may be an instruction to delete every row of a database that includes a specific value in a specific column, or to delete rows that are both in a specified range of rows and include a specific value in a specific column.

Multiple processing threads may be generated. To handle the instruction to perform the database operation on multiple rows of the database, the client application may generate multiple processing threads. The client application may generate any suitable number of processing threads, and the number may be based on, for example, the number of rows on which the database operation will be performed.

Three random numbers may be generated for each of the multiple processing threads. For example, the client application may generate three random numbers each time the client application generates a new processing thread. The random numbers may have any suitable level of randomness, for example, may be pseudorandom, and may be generated within specified ranges.

The first random number generated for a processing thread may be used to set the starting point for that processing thread. The starting point for a processing thread may indicate the row of the database that the processing thread will use as a starting point in determining which rows of the database the processing thread will perform the database operation on. The first random number may be an integer. For example, if the first random number generated for a processing thread is 45268, the rows of the database that processing thread is responsible for performing the database operation on may start at row 4526. The first random number may be generated within a range that includes all of the rows of the database that the processing thread will perform the database operations on. For example, if the database has 150000 rows that start at row 0, the first random number may be generated in the range from 0 to 149999.

The second random number generated for a processing thread may be used as an offset for that processing thread. The offset for a processing thread may indicate how many rows of the database the processing thread will perform the database operation on. The second random number may be an integer. For example, if the second random number generated for a processing thread is 6039, the processing thread may be responsible for performing the database operation on 6039 rows of the database, starting at the starting point for the processing thread. The second random number may be generated within any suitable range. The range for the second random number may be configurable, for example, by a user of the client application. The range for the second random number may, in some implementations, be between 1000 and 10000.

The third random number generated for a processing thread may be used to determine an order for that processing thread. The order for a processing thread may determine in which direction from the starting point the rows the processing thread will be responsible for performing that database operations on will be located. The order may be determined from the third random number in any suitable manner. For example, the order may be an integer generated from any suitable range, and if the order is an even number, the rows may be located ascending from the starting point, and if the order is an odd number, the rows may be located descending from the starting point. For example, if the third random number for a processing thread is 565, the first random number for the processing thread, indicating the starting point, is 56134, and the second random number for the processing thread, indicating the offset, is 3098, then the processing thread may be responsible for performing the database operations on 3098 rows of the database starting at row 56134 and descending, which may be rows 53127 to 56134.

The processing threads may generate dynamic queries to be run against the database. Each processing thread generated by the client application, after having three random numbers generated for it, may have those three random numbers used to generate a dynamic query that can be run against the database. A dynamic query generated by a processing thread may include the database operation that will be performed, and may indicate which rows the database operation will be performed on based on the starting point, offset, and order indicated by the three random numbers generated for the processing thread. The three random numbers generated for a processing thread may be used to determine the range of the rows in the database that the processing thread will be responsible for. The dynamic query may include any conditions on the performance of the database operation. For example, a dynamic query based on a conditional database operation for the deletion of rows may include the conditions specified in in the instruction for the database operation that was received by the client application.

A dynamic query generated by a processing thread may include instructions to perform the database operations on rows of the database that are part of the number of rows of the database based on the offset of the processing thread, located in a direction indicated by the order of the processing thread, and starting at a row indicated by the starting point of the processing thread. The three random numbers generated for a processing thread may be used to determine the range of rows the processing thread is responsible for performing the database operation on and that range may be included in the dynamic query. The range may be determined by, for example, the processing thread itself, or by, for example, the client application, which may then pass the range to the processing thread either after the processing thread is generated or as part of the generation of the processing thread, for example, as a parameter. One end of the range of rows that processing thread is responsible for performing the database operation on may be determined as the row at the starting point and the other end of the range of rows may be determined as the row that is the offset minus one rows away from the starting point in the direction indicated by the order. For example, if the first random number for the processing thread, indicating the starting point, is 56134, the second random number for the processing thread, indicating the offset, is 3098, and if the third random number for the processing thread, indicating the order, is 565, then it may be determined that the processing thread is responsible for a range of rows with one end being the $56134^{th}$ row in the database, descending to encompass 3098 total rows, resulting in the other end being the 56134-3098-1=$53127^{th}$ row in the database. As another example, if the first random number for the processing thread, indicating the starting point, is 56134, the second random number for the processing thread, indicating the offset, is 3098, and if the third random number for a processing thread, indicating the order, is 568, then it may be determined that the processing thread is responsible for a range of rows with one end being the $56134^{th}$ row in the database, ascending to encompass 3098 total rows, resulting in the other end being the 56134+3098-1=$59231^{th}$ row in the database. In some cases, a processing thread may be responsible for fewer rows than would be indicated by the offset if, for example, the starting point is close enough to the beginning or end of the database that there aren't enough rows in the direction indicated by the order for the processing thread to be responsible for a number of rows equal to the offset. For example, if the starting point for a processing thread is the $999^{th}$ row, the order is descending, and the offset is 2000, the processing thread may only be responsible for 1000 rows, from 0 to 999, rather than 2000 rows. The dynamic query may also include any condition on the performance of the database operation from the instruction to perform the database operation. For example, if the database operation is the deletion of rows that store a "1" in their fifth column, the dynamic query generated by a processing thread responsible for rows numbered 56134 to 59231 may check the fifth column of each row numbered 56134 to 59231 for a "1", and may only delete those rows the store a "1" in the firth column, meeting the condition of the database operation. If the database operation is the deletion of rows that both store a "1" in their fifth column and are in the range of rows numbered 56000 to 57000, the dynamic query generated by the processing thread may only delete a row if it is confirmed that the number of the row is in the specified range and that the row stores "1" in its fifth column.

The dynamic queries may be run against the database to perform the database operations. After a processing thread generates a dynamic query, the dynamic query may be run against the database in order to perform the database operation on the rows that the processing thread is responsible for, as indicated by the dynamic query. All processing threads from among multiple processing threads may run their dynamic queries at any time, and in any order. Because the database operation may be idempotent, collisions among the multiple processing threads may be acceptable. The database may therefore be unpartitioned, as there may be no need to partition the database to assign each processing thread a separate range of rows to ensure that the processing threads do not collide. For example, due to the use of random number generation in determining which rows a processing thread is responsible for, more than one processing thread may be responsible for performing the database operation on the same row of the database. Every processing thread may perform the database operations, regardless of collisions, as the idempotent nature of the database operations will prevent unintended changes to the database. For example, if the database operation is to delete marked rows of the database, one processing thread may attempt to delete a row that has already been deleted by another processing thread. Because the row is already deleted, the attempt by the later processing thread to delete the already deleted row may have no effect on the database, and the processing thread may continue to delete any other rows for which it may be responsible. Other idempotent operations may include, for example, setting a cell in a column of a row of a database to a specific value, or retrieving data from a row of the database.

Once a processing thread has finished performing the database operation on the rows of the database for which it is responsible, the processing thread may reset. A processing thread that is reset may receive three new random numbers generated by the client application, causing the processing thread to perform the database operation on new range of rows of the database. The generation and resetting of processing threads may continue for any suitable period of time to ensure that all of the rows of the database on which the database operation is to be performed end up as the responsibility of a processing thread and have the database operation performed on them. Processing threads that finish performing the database operation on the rows of the database for which they are responsible may also be terminated. The client application may generate additional processing threads, generating three random numbers for each generated processing thread, at any time.

FIG. 1 shows an example system suitable for multi-threaded dynamic queries on an unpartitioned database according to an implementation of the disclosed subject matter. A computing device 100 may be any suitable computing device, such as, for example, a computer 20 as described in FIG. 7, or component thereof, for implementing multi-threaded dynamic queries on an unpartitioned database. The computing device 100 may include a client application 110 and a storage 150. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The client application 110 may be any suitable combination of hardware and software of the computing device 100 for interacting with a database, such as a database 161 in the storage 150. The client application 110 may generate processing threads, such as processing threads 111, 112, 113, and 114, to perform database operations on the database 161. To generate a processing thread, the client application 110 may generate three random numbers, with a first random number being used to set a starting point for the processing thread, the second random number being used as an offset for the processing thread, and a third random number being used to determine an order for the processing thread. The three random numbers may be used to determine a range of rows, for example, rows from rows 162 of the database 161, a processing thread generated by the client application 110 will be responsible for performing the database operation on. The client application 110 may generate any suitable number of processing threads in this manner, and may also generate three new random numbers for processing threads that have finished and reset. The client application 110 may generate processing threads in response to any suitable event, including user input, or based on any suitable schedule. For example, the client application 110 may receive input from a user of the computing device 100 instructing the client application 110 perform a database operation on rows from the rows 162 of the database 161, and may generate processing threads, such as the processing threads 111, 112, 113, and 114, to perform the database operation. As another example, the client application 110 may have a scheduled task to periodically perform a database operation on rows of the rows 162 of the database 161, and may generate processing threads, such as the processing threads 111, 112, 113, and 114, to perform the database operation according the schedule for the task.

The storage 150 may be any suitable combination of hardware and software for storing data. The storage 150 may include any suitable combination of volatile and non-volatile storage hardware, and may include components of the computing device 100 and hardware accessible to the computing device 100, for example, through wired and wireless direct or network connections. The storage 150 may store a database 161. The database 161 may be, for example, a single or a multi-tenant database. The tenants of the database 161 may be, for example, businesses or other organizations. The database may store data in rows 162. Rows of the rows 162 may be numbered rows, each of which may store data in cells across a number of columns. For example, the rows 162 may include 40000 rows, with a first row numbered 0 and a last row numbered 39999. Rows of the rows 162 may be numbered contiguously.

Figure 2A:
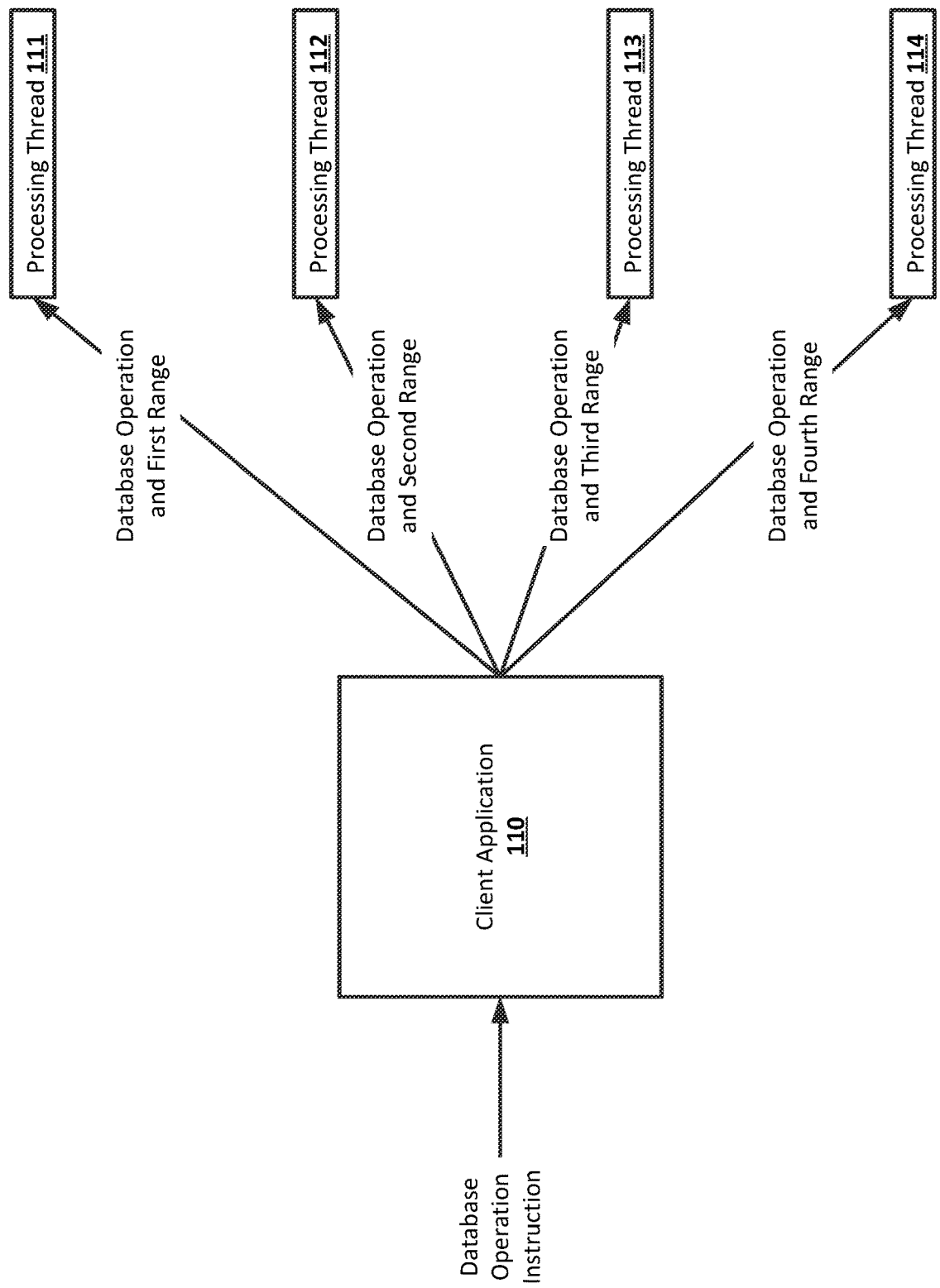
FIG. 2A shows an example arrangement suitable for multi-threaded dynamic queries on an unpartitioned database according to an implementation of the disclosed subject matter.

FIG. 2A shows an example arrangement suitable for multi-threaded dynamic queries on an unpartitioned database according to an implementation of the disclosed subject matter. The client application 110 may receive a database operation instruction. The database operation instruction may instruct the performance of a database operation on rows from the rows 162 of the database 161. The database operation may also be conditional, for example, only to be performed on rows that meet some specified criteria. A condition on the database operation may specify rows from the rows 162 in any suitable manner. For example, the database operation instruction may include a condition that the database operation be performed on every row, rows specified by row number, rows that store in specified columns values that meet some specified criteria, rows that are in a specified range or ranges of rows, or based on any other suitable criteria that may be used to identify rows from the rows 162 of the database 161.

To perform the database operation from the database operation instruction, the client application 110 may generate any suitable number of processing threads, for example, the processing threads 111, 112, 113, and 114. To generate the processing threads 111, 112, 113, and 114, the client application 110 may generate three random numbers for each of the processing threads 111, 112, 113, and 114. The first random number generated for a processing thread may be used as the starting point for the processing thread, the second random number generated for a processing thread may be used as an offset for the processing thread, and the third random number generated for a processing thread may be used to determine an order for the processing thread. The client application 110, or the processing thread, may use the three random numbers generated for the processing threads to determine the range of rows from the rows 162 of the database 161 that the processing thread will be responsible for performing the database operation on. The client application 110 may send a first range, determined from the three numbers for the processing thread 111, to the processing thread 111 along with the database operation, including any conditions on the database operation. The client application 110 may send a second range, determined from the three numbers for the processing thread 112, to the processing thread 112 along with the database operation, including any conditions on the database operation. The client application 110 may send a third range, determined from the three numbers for the processing thread 113, to the processing thread 113 along with the database operation, including any conditions on the database operation. The client application 110 may send a fourth range, determined from the three numbers for the processing thread 114, to the processing thread 114 along with the database operation, including any conditions on the database operation. The first, second, third and fourth ranges may be disjoint or may overlap in any manner, and may encompass any percentage of the rows from the rows 162 of the database 161.

For example, the client application 110 may generate a first random number for the processing thread 111, indicating the starting point, of 17855, a second random number for the processing thread 111, indicating the offset, of 9503, and a the third random number for the processing thread 111, indicating the order, of 565. It may be determined from these three random number generated for the processing thread 111 that the processing thread 111 will be responsible for a range of rows from the rows 162 of the database 161 that goes from the row numbered 8353 to the row numbered 17855. This range may be sent to the processing thread 111, for example, as a parameter used during the generation of the processing thread 111 or passed in to the processing thread 111 once the processing thread 111 has started running on the computing device 100. The processing thread 111 may also determine the range itself after being passed the three random numbers generated for the processing thread 111 by the client application 110.

Figure 2B:
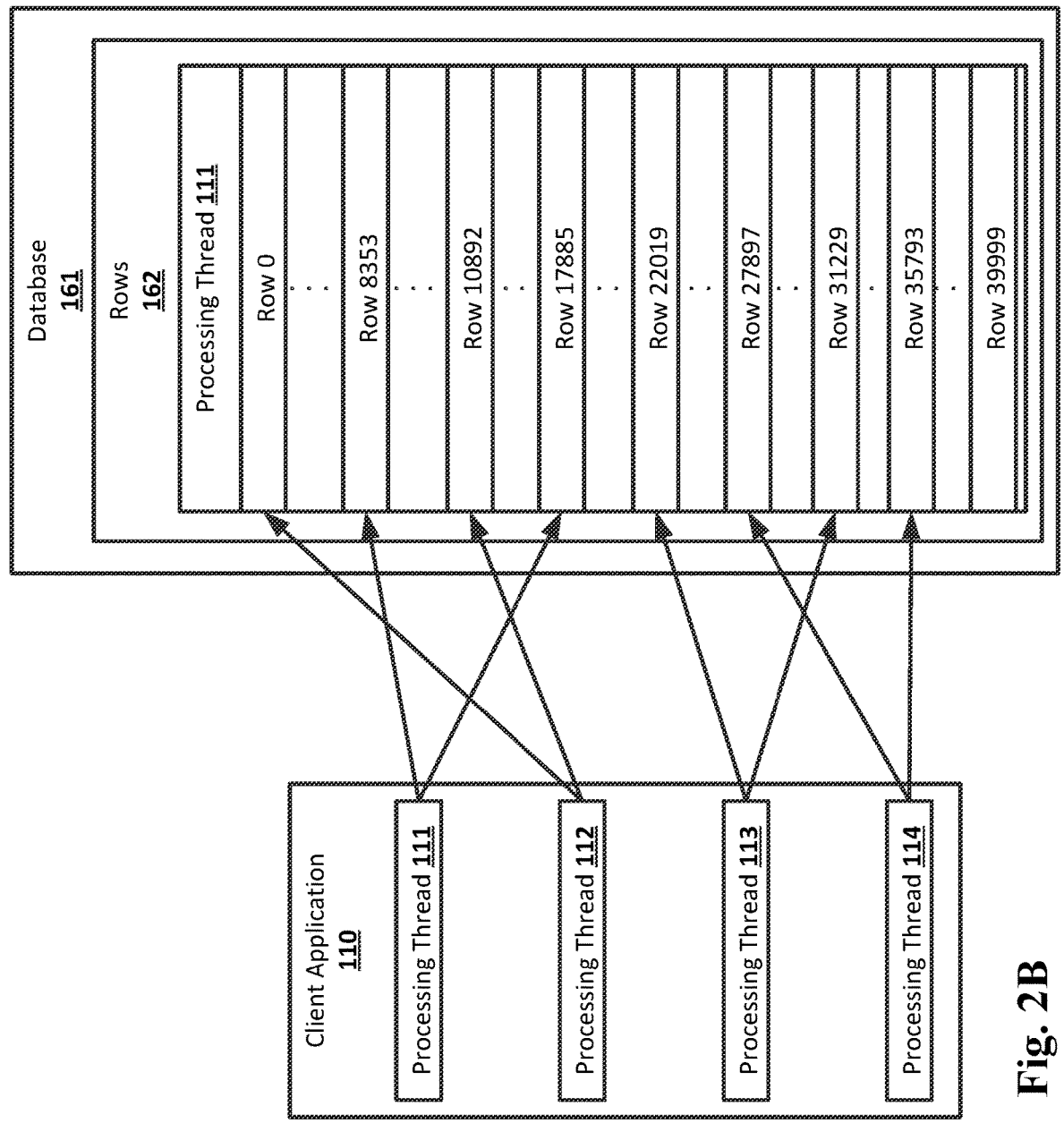
FIG. 2B shows an example arrangement suitable for multi-threaded dynamic queries on an unpartitioned database according to an implementation of the disclosed subject matter.

FIG. 2B shows an example arrangement suitable for multi-threaded dynamic queries on an unpartitioned database according to an implementation of the disclosed subject matter. The database 161 may include 40000 rows, from a row numbered 0 to a row numbered 39999, stored as the rows 162. The processing threads 111, 112, 113, and 114, running on the computing device 100, may perform the database operation on the rows from the rows 162 of the database 161 that are part of their respective ranges, as determined based on the three random numbers that were generated for each of the processing threads 111, 112, 113, and 114 by the client application 110. For example, the processing thread 111 may be responsible for performing the database operation on the range of rows from row 8353 to row 17885. The processing thread 112 may be responsible for performing the database operation on the range of rows from row 0 to row 10892. The processing thread 113 may be responsible for performing the database operation on the range of rows from row 22019 to row 31229. The processing thread 114 may be responsible for performing the database operation on the range of rows from row 27897 to row 35793.

The processing threads 111, 112, 113, and 114 may perform the database operation on the rows in their respective ranges without the database 161 being partitioned to avoid collisions. Because the ranges of the processing threads 111, 112, 113, and 114 may overlap, the database operation may be performed on the same row more than once. For example, both the processing thread 111 and the processing thread 112 may be responsible for performing the database operation on the row numbered 8353. Since the database operation may be idempotent, both the processing threads 111 and 112 may perform the database operation on the row numbered 8353 when they encounter the row without regard for whether the other processing thread has already performed the database operation on the row numbered 8353. For example, if the database operation is a deletion operation with a condition, and the row numbered 8353 meets the condition, the processing thread 111 may be the first to process the row numbered 8353 and may, upon determining that the row meets the condition of the deletion operation, delete the row numbered 8353. When the processing thread 112 attempts to process the row 8353, it may discover that the row has already been deleted. If the data operation is, for example, the setting of a cell of a column of a row to a particular value, and the processing thread 111 has already set the cell of the appropriate column of the row numbered 8353 to the particular value, the processing thread 112, on processing the row numbered 8353, may either determine that the cell has already been set to the particular value, or may also set the cell to the particular value, which may not change the value stored in the cell.

The processing threads 111, 112, 113, and 114 may operate concurrently or in parallel, for example, depending on the processing capabilities of the computing device 100 and the capabilities of the database 161. The processing threads 111, 112, 113, and 114 may each continue to process rows in their respective ranges from the rows 162 of the database 161 until they have processed each row in their respective ranges, for example, performing the database operation on each row in their respective ranges, or on each row in their respective ranges that meets conditions on the database operation.

Figure 2C:
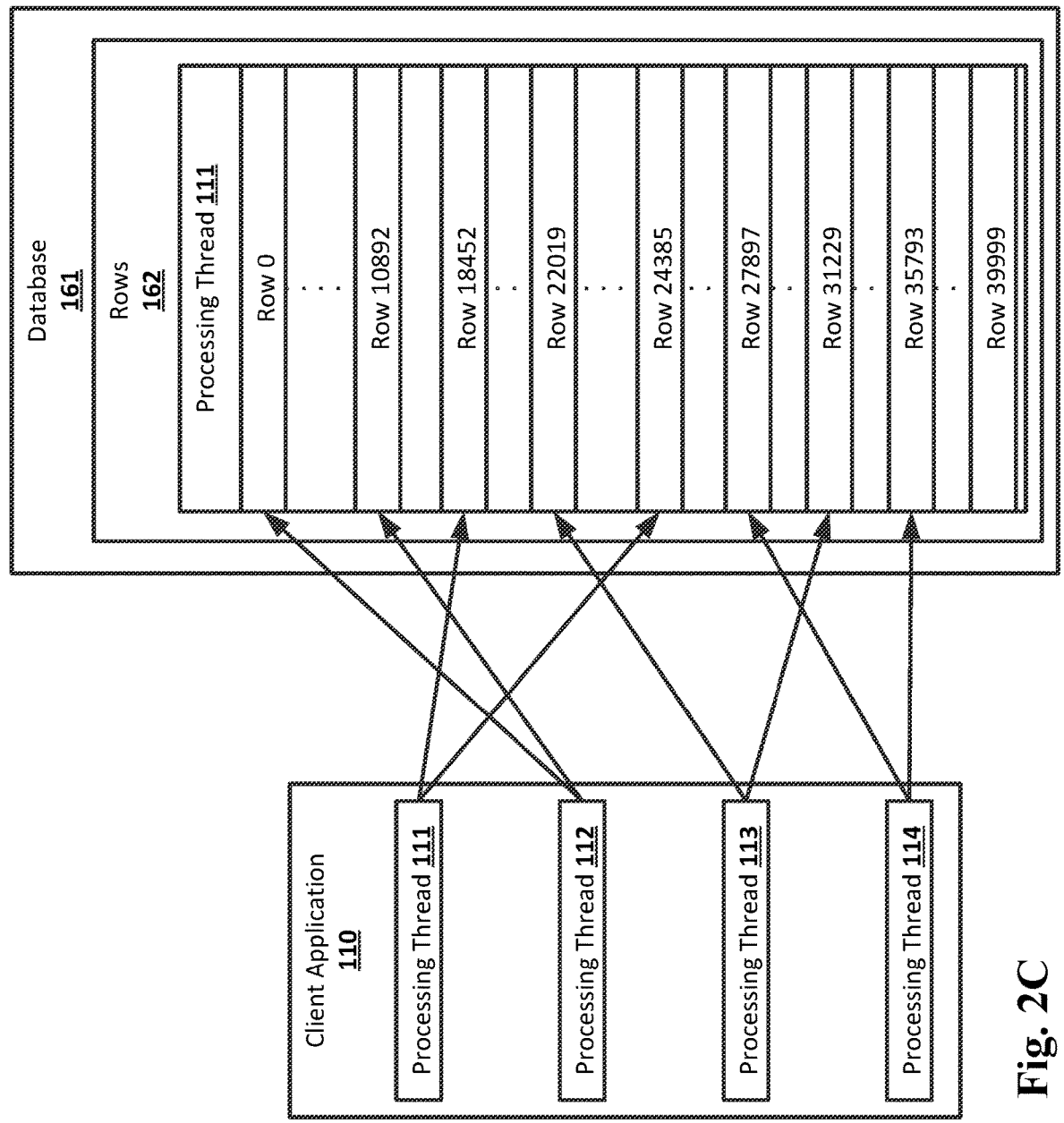
FIG. 2C shows an example arrangement suitable for multi-threaded dynamic queries on an unpartitioned database according to an implementation of the disclosed subject matter.

FIG. 2C shows an example arrangement suitable for multi-threaded dynamic queries on an unpartitioned database according to an implementation of the disclosed subject matter. After a processing thread finishes processing every row in its range, the processing thread may be reset. For example, the processing thread 111 may finish processing every row in the range from the row numbered 8353 to the row numbered 17885. The processing thread 111 may be reset. The client application 110 may generate three new random numbers for the processing thread 111, determining a new range of rows that the processing thread 111 will be responsible for performing the database operation on. For example, the client application 110 may generate three random numbers that result in the processing thread 111 being responsible for performing the database operation on a range of rows from the row numbered 18452 to the row numbered 24835. The processing thread 111 may then process the rows from the rows 162 of the database 161 in this new range, even as the processing threads 112, 113, and 114 may still be processing the rows in their original ranges. Processing threads may be reset any number of times, and over any suitable time period. For example, processing threads may continually be reset if the database operation is meant to be performed continually on the database 161, or may stop being reset and be terminated based on any suitable criteria, such as the passage of any suitable amount of time or the occurrence of any suitable event. The resetting of processing threads by the client application may ensure that, over time, every row from the rows 162 of the database 161 is processed by a processing thread and has the database operation performed on it, subject to the conditions of the database operation, even if the original ranges assigned to the processing threads after they are generated don't cover every row from the rows 162 in the database 161.

In some implementations, processing threads that finish processing every row in their assigned range may be terminated, and the client application 110 may then optionally generate a new processing thread. The client application 110 may also generate new processing threads even if no processing thread has recently terminated.

Figure 3:
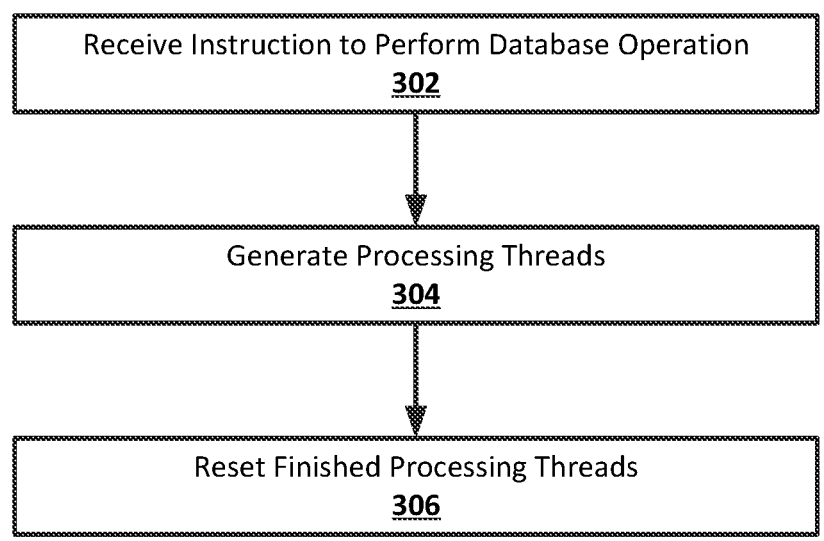
FIG. 3 shows an example procedure suitable for multi-threaded dynamic queries on an unpartitioned database according to an implementation of the disclosed subject matter.

FIG. 3 shows an example procedure suitable for multi-threaded dynamic queries on an unpartitioned database according to an implementation of the disclosed subject matter. At 302, an instruction to perform a database operation may be received. For example, the client application 110 may receive an instruction to perform a database operation on the database 161. The instruction may be received from any suitable source, including, for example through user input to the client application 110, from another application running on the computing device 100 or another computing device, or the instruction may be generated by the client application 110 itself, for example, as part of a task that is performed based on a timer or the occurrence of any suitable event. For example, the instruction may be to delete all rows from the rows 162 of the database 161 that are marked for deletion.

At 304, processing threads may be generated. For example, the client application 110 may generate any number of separate processing threads, such as the processing threads 111, 112, 113, and 114, that may run on the computing device 100 and may perform the database operation based on the instruction received by the client application 110. The client application 110 may, for each processing thread, generate three random numbers that may be used to determine the starting point, offset, and order for the processing thread, determining the range of rows from the rows 162 of the database 161 that the processing thread will be responsible for performing the database operation on.

At 306, finished processing threads may be reset. For example, the client application 110 may reset a processing thread, such as the processing thread 111, when the processing thread has finished processing all of the rows from the rows 162 of the database 161 for which the processing thread was responsible. The processing thread 111 may, for example, have processed all rows of the rows 161 from the row numbered 8353 to the row numbered 17885, performing the database operation on any of the rows that met the conditions, if any, on the database operation. The client application 110 may reset the processing thread 111 by generating three new random numbers, which may serve as a new starting point, new offset, and new order for the processing thread 111, determining a new range of rows of the rows 162 of the database 161 for which the processing thread 111 will be responsible. In some cases, a processing thread that has finished may terminate instead of being reset, and the client application 110 may generate new processing thread with three new random numbers.

Figure 4:
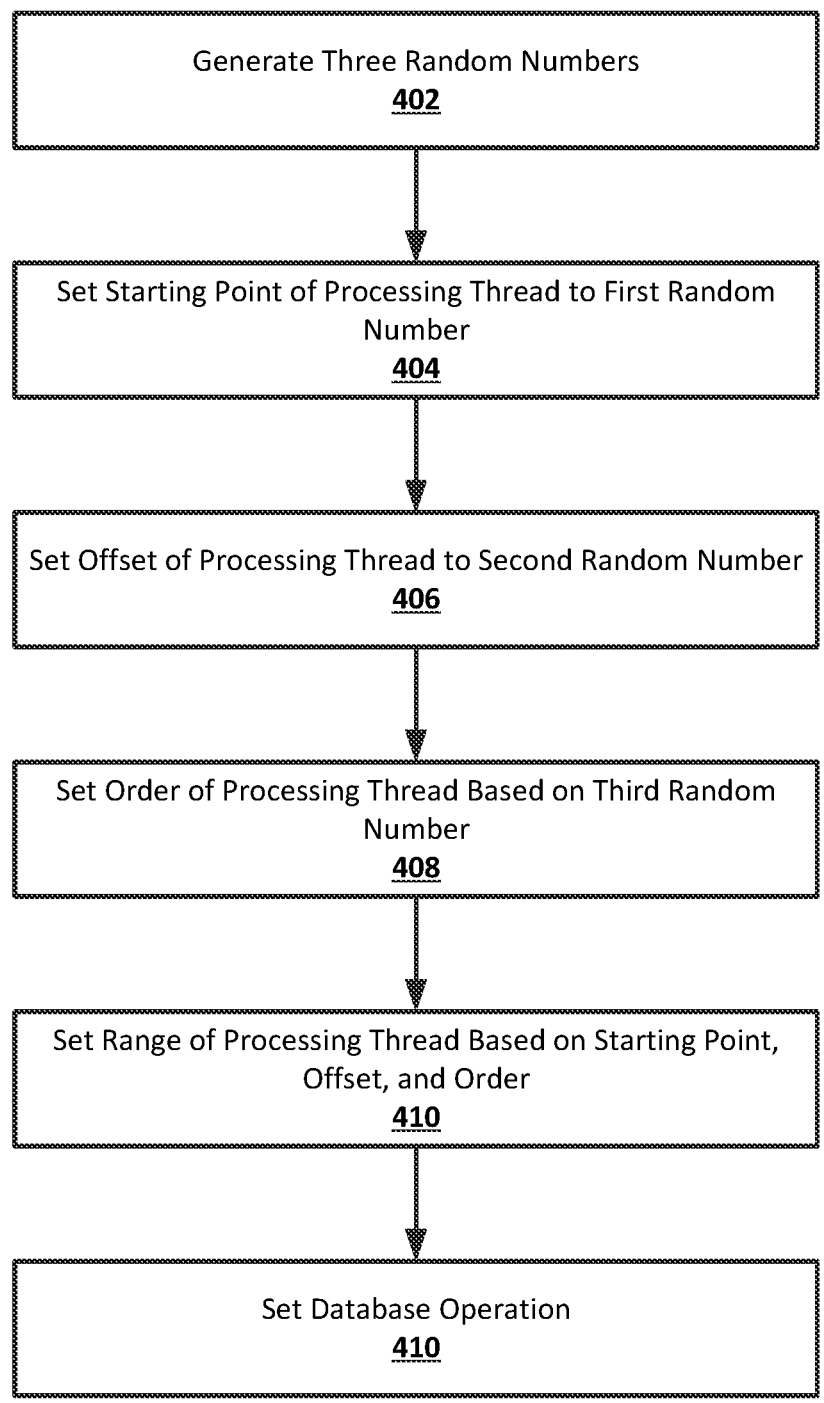
FIG. 4 shows an example procedure suitable for multi-threaded dynamic queries on an unpartitioned database according to an implementation of the disclosed subject matter.

FIG. 4 shows an example procedure suitable for multi-threaded dynamic queries on an unpartitioned database according to an implementation of the disclosed subject matter. At 402, three random numbers may be generated. For example, to generate a processing thread such as the processing thread 111, the client application 110 may generate three random numbers. The three random numbers may be generated in any suitable manner, using any suitable source of entropy for randomness, and may be random or pseudo-random. The three random numbers may be generated in any suitable ranges, and may, for example, be generated as positive integers to allow the first and second random numbers to be used as the starting point and offset.

At 404, a staring point of a processing thread may be set to the first random number. For example, the starting point of the processing thread 111 may be set to the first random number generated by the client application 110 for the processing thread 111. The first random number may be, for example, 8353, which may indicate that the processing thread 111 will be responsible for processing rows from the rows 162 starting at the row numbered 8353.

At 406, an offset of the processing thread may be set to the second random number. For example, the offset of the processing thread 111 may be set to the second random number generated by the client application 110 for the processing thread 111. The second random number may be, for example, 9533, which may indicate that the processing thread will be responsible for processing 9533 rows from the row 162.

At 408, an order of the processing thread may be set based on the third random number. For example, the order of the processing thread 111 may be set based on the third random number generated for the processing thread by the client application 110. For example, if the third random number is even, the order may be ascending, and if the third random number is odd, the order may be descending. The third random number may be, for example, 3432, which as an even number may indicate that the processing thread 111 will be responsible for processing rows ascending from the starting point for the processing thread 111.

At 410, the range of the processing thread may be set based on the starting point, offset, and order. For example, the range of rows from the rows 162 of the database 161 that the processing thread 111 will be responsible for processing may be determined using the starting point, offset, and order set for the processing thread 111 using the three random numbers generated for the processing thread 111 by the client application 110. The range of the processing thread 111 may start at the row indicated by the starting point, for example, the row numbered 8353, and encompass a number of rows equal to the offset minus one, for example, 9533−1=9532 in the direction indicated by the order, for example, ascending, resulting in the end of the range being the row numbered 17855. The range of the processing thread 111 may be determined by the processing thread 111, by the client application 110, or in any other suitable manner. For example, the client application 110 may, after generating the three random numbers, determine the range based on the three random numbers and use the range as a parameter during the generation of the processing thread 111, or may pass the range into the processing thread 111 after the processing thread 111 starts executing on the computing device 100. The client application 110 may also pass the three random numbers to the processing thread 111, which may then use the three random numbers to sets its own starting point, offset, and order, and determine its own range.

At 412, a database operation may be set. For example, the database operation to be performed by a processing thread, such as the processing thread 111, may be set by the client application 110. The client application 110 may set the database operation in any suitable parameter, for example, passing the database operation to the processing thread 111 when the processing thread 111 is generated or after the processing thread 111 starts executing. Any conditions on the database operation may be passed to the processing thread 111 along with the database operation itself.

The client application 110 may generate any number of processing threads in this manner, and may also reset already generated processing threads that have finished in this manner.

Figure 5:
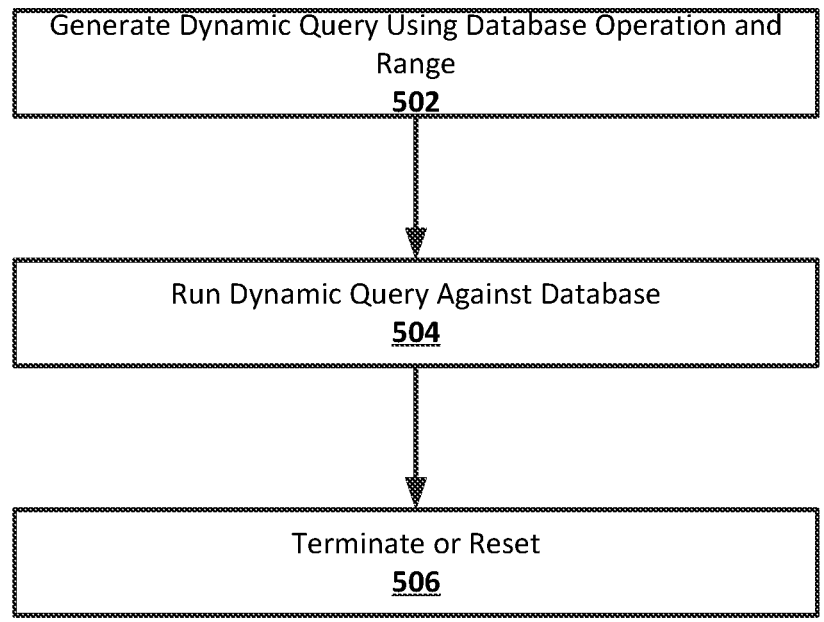
FIG. 5 shows an example procedure suitable for multi-threaded dynamic queries on an unpartitioned database according to an implementation of the disclosed subject matter.

FIG. 5 shows an example procedure suitable for multi-threaded dynamic queries on an unpartitioned database according to an implementation of the disclosed subject matter. At 502, a dynamic query may be generated. For example, the processing threads generated by the client application 110, for example, the processing threads 111, 112, 113, and 114, may each a generate dynamic query to be run against the database 161 to perform the database operation on their respective ranges of rows from the rows 162. The database operation may, for example, be the deletion of marked rows. The processing thread 111 may generate a dynamic query that may be run against the database 161 to check which rows from the rows 162 in the range the processing thread is responsible for, for example, from the row numbered 8353 to the row numbered 17855, are marked for deletion, and to delete those rows.

At 504, the dynamic query may be run against the database. For example, the processing threads 111, 112, 113, 114, and may run each dynamic query they generated against the database 161. The processing thread 111 may, for example, run a dynamic query against the database 161 that checks the rows in the range of the processing thread 111, for example, from the row numbered 8353 to the row numbered 17855, and deletes rows that are marked for deletion. The dynamic queries from multiple processing threads, such as the processing threads 111, 112, 113, and 114, may be run against the database 161 without partitioning the database 161, and without checking for collisions between the processing threads 111, 112, 113, and 114. As the database operation may be idempotent, the order in which the processing threads 11, 112, 113, and 114 process rows that are in the range of more than one processing thread may not matter. The dynamic queries may be run against the database 161 in any order, and may run concurrently or in parallel as permitted by the database 161 and the availability of logical processors.

At 506, a processing thread may terminate or be reset. For example, when the processing thread 111 finishes running its dynamic query against the database 161 by finishing processing all rows in the range the processing thread 111 is responsible for, the processing thread 111 may terminate or reset. If the processing thread 111 resets, the client application 110 may generate three new random numbers for the processing thread 111, setting a new starting point, new offset, and new order for the processing thread 111, resulting in a new range for the processing thread 111. The database operation may remain the same, or may be changed by the client application 110. The processing thread 111 may then generate a new dynamic query to be run against the database 161 to perform the database operation, whether the same or changed, on rows in the new range for the processing thread 111.

Figure 6:
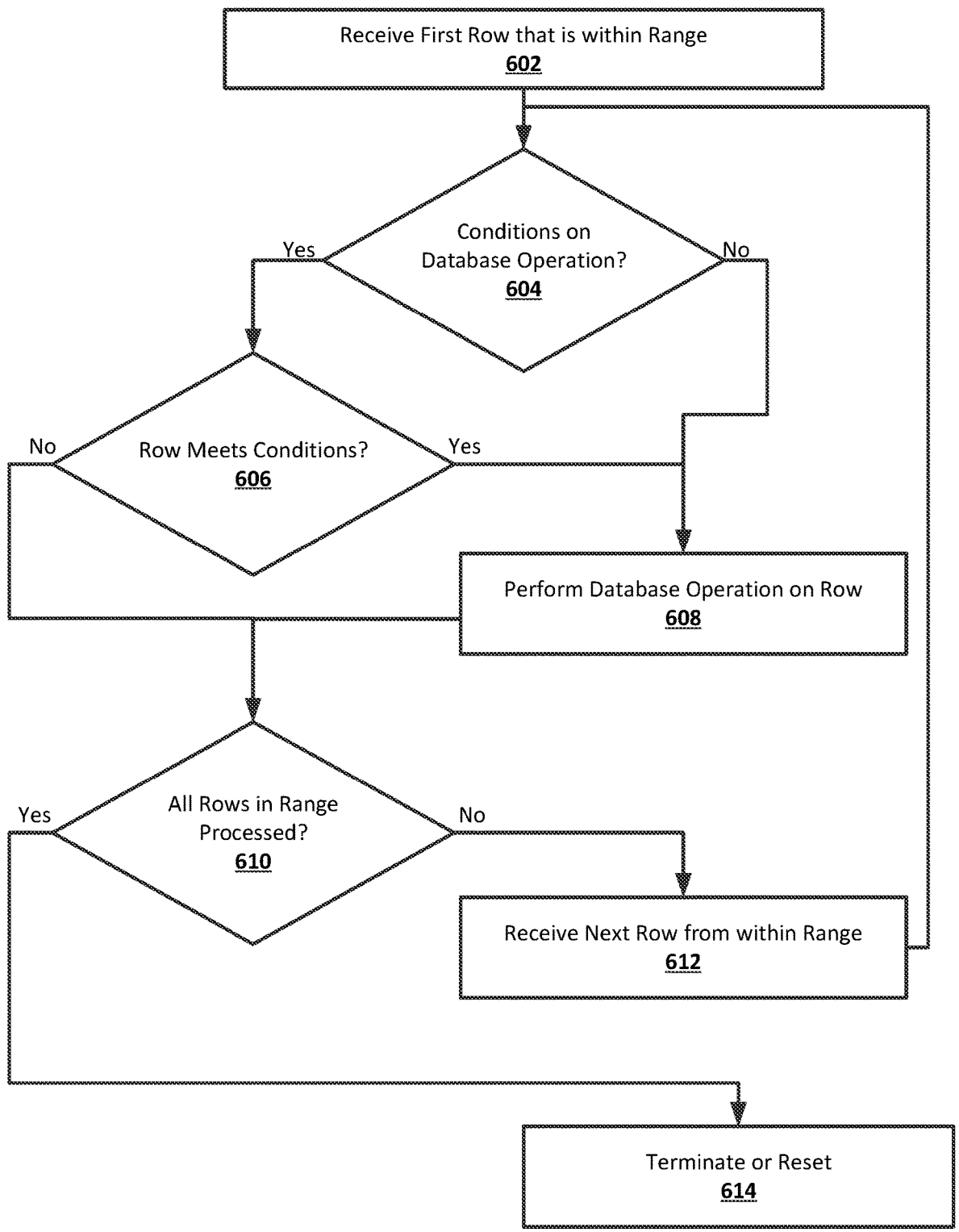
FIG. 6 shows an example procedure suitable for multi-threaded dynamic queries on an unpartitioned database according to an implementation of the disclosed subject matter.

FIG. 6 shows an example procedure suitable for multi-threaded dynamic queries on an unpartitioned database according to an implementation of the disclosed subject matter. At 602, a first row may be received from within a range. For example, the processing thread 111 may run the dynamic query it generated against the database 161. The processing thread 111 may receive a first row from the rows 162 that is within the range of rows for which the processing thread 111 is responsible, as determined by the three numbers that were generated for the processing thread 111. The first row may be any row from within the range, and may be, for example, the row at the starting point from the processing thread 111, for example, the row numbered 8353, the last row in the range, for example, the row numbered 17855, or any row in between so long as the which rows have already been received are tracked. The row may be received by the processing thread 111 from the database 161 as a result of running the dynamic query against the database 161. In some implementations, the processing thread 111 may receive all of the rows in its range from the database 161, and may then select a first row to start processing.

At 604, if there are conditions on the database operation, flow may proceed to 606, where the row may be checked to determine if its meets the conditions on the database operation, otherwise flow may proceed to 608, where the database operation may be performed on the row. For example, the database operation to be performed by the processing thread 111, as per the instruction received at the client application 110, may have conditions that may limit which rows the database operation should be performed on. The condition may be, for example, that a row has a row number that meets some criteria, or that the row stores a value or values in cells of a specified column or columns. If the database operation has conditions, a row may need to be determined to have met those conditions before the database operation is performed on the row.

At 606, if the row meets the condition on the database operation, flow may proceed to 608 where the database operation may be performed, otherwise flow may proceed to 610, where it may be determined if there any more rows in the range to process. For example, the database operation to be performed by the processing thread 111, as per the instruction received at the client application 110, may have conditions that may limit which rows the database operation should be performed on. The condition may be, for example, that a row has a row number that meets some criteria, or that the row stores a value or values in cells of a specified column or columns. The row may be checked to determine if its meet the condition, for example, with the processing thread 111 checking values in any cells of columns of the row specified in the conditions on the database operation and determining if the values meet conditions.

At 608, the database operation may be performed on the row. For example, the database operation may have no conditions, or the processing thread 111 may have determined that the row meets any conditions on the database operation. The processing thread 111 may perform the database operation on the row. For example, if the database operation is row deletion, the processing thread 111 may delete the row. If the database operation is to set a cell for a column of a row to a specified row, the processing thread 111 may set that cell to the specified value. The processing thread 111 may perform the database operation in any suitable manner that may result in the appropriate changes being made to the row in the database 161.

At 610, if all of the rows in the range of the processing thread have been processed, flow may proceed to 614, where the processing thread may reset or terminate, otherwise flow may proceed to 612, where the next row may be received. For example, after the processing thread 111 has finished processing a row from the rows 162, the processing thread 111 may determine if it has processed all of the rows in its range. If the processing thread 111 has processed all the rows in its range, for example, all rows from the row numbered 8353 to the row 17855, there may be no more rows from the rows 162 for which the processing thread 111 is responsible.

At 612, the next row may be received. For example, the processing thread 111 may receive another row from the rows 162 that is within the range of rows for which the processing thread 111 is responsible. The row may be a row that that the processing thread 111 has not already processed based while processing the rows in the current range for the processing thread 111. The next row may be selected in any suitable manner. For example, the processing thread 111 may process rows from within its range in ascending or descending order, or in any other manner so long as the processing thread 111 processes each row within its range and does not repeat processing a row. Flow may proceed back to 604, as the processing thread 111 may process the row received at 612.

At 614, a processing thread may terminate or be reset. For example, when the processing thread 111 finishes running its dynamic query against the database 161 by finishing processing all rows in the range the processing thread 111 is responsible for, the processing thread 111 may terminate or reset. If the processing thread 111 resets, the client application 110 may generate three new random numbers for the processing thread 111, setting a new starting point, new offset, and new order for the processing thread 111, resulting in a new range for the processing thread 111. The database operation may remain the same, or may be changed by the client application 110. The processing thread 111 may then generate a new dynamic query to be run against the database 161 to perform the database operation, whether the same or changed, on rows in the new range for the processing thread 111.

Figure 7:
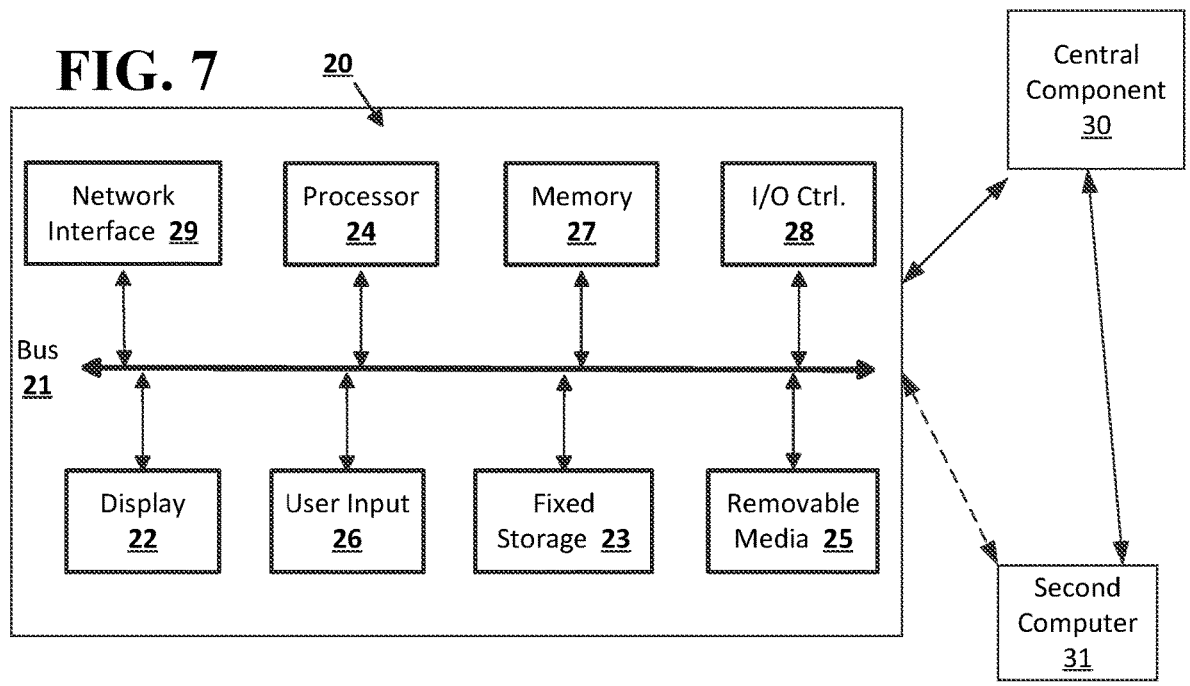
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
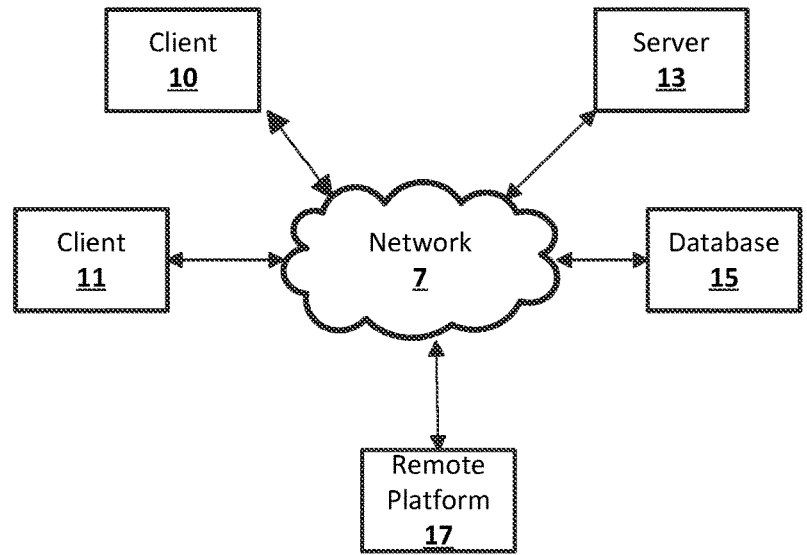
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
    receiving an instruction to perform a database operation on rows of a database;
    generating two or more processing threads by, for each processing thread of the two or more processing threads:
        generating three random numbers,
        setting a starting point of the processing thread to a first of the three random numbers,
        setting an offset of the processing thread to a second of the three random numbers, and
        setting an order of the processing thread based on a third of the three random numbers wherein the order indicates a direction of either ascending from the starting point or descending from the starting point;
    generating, with each of the two or more processing threads, a dynamic query, wherein a dynamic query generated by a processing thread of the two or more processing threads comprises an instruction to perform the database operation on rows of the database that are part of a number of rows of the database based on the offset of the processing thread and located in the direction indicated by the order of the processing thread starting at a row of the database indicated by the starting point of the processing thread;
    running each dynamic query against the database to perform the database operation; and
    terminating or resetting a processing thread of the two or more processing threads after the processing thread finishes running its dynamic query against the database by performing the database operation on the rows of the database that are part of the number of rows of the database based on the offset of the processing thread and located in the direction indicated by the order of the processing thread starting at the row of the database indicated by the starting point of the processing thread.

2. The computer-implemented method of claim 1, wherein the database operation is idempotent.

3. The computer-implemented method of claim 1, further comprising:
    generating one or more additional processing threads by, for each processing thread of the one or more additional processing threads:
        generating three random numbers,
        setting a starting point of the processing thread to a first of the three random numbers,
        setting an offset of the processing thread to a second of the three random numbers, and
        setting an order of the processing thread based a third of the three random numbers.

4. The computer-implemented method of claim 1 wherein the second of the three random numbers is generated from a range of 1000 to 10000.

5. The computer-implemented method of claim 1, further comprising:
    resetting a processing thread of the two or more processing threads when the database operation has been performed on all of the rows that are part of a number of rows of the database equal to the offset of the processing thread and in a direction indicated by the order of the processing thread starting at a row of the database indicated by the starting point of the processing thread, wherein resetting the processing thread of the two or more processing threads comprises:
    generating three additional random numbers;
    setting a new starting point of the processing thread to a first of the three additional random numbers,
    setting a new offset of the processing thread to a second of the three additional random numbers, and
    setting a new order of the processing thread to a third of the three additional random numbers.

6. The computer-implemented method of claim 1, wherein there are conditions on the database operation, and further comprising:
 checking, by each of the two or more processing threads, rows of the database to determine if the rows of the database meet the conditions; and
 performing the database operation on rows that meet the conditions on the database operation.

7. The computer-implemented method of claim 1, wherein the database is not partitioned when the dynamic queries are run against the database.

8. A computer-implemented system comprising:
 one or more storage devices comprising a database comprising rows; and
 a processor that receives an instruction to perform a database operation on the rows of the database,
 generates two or more processing threads by, for each processing thread of the two or more processing threads:
  generating three random numbers,
  setting a starting point of the processing thread to a first of the three random numbers,
  setting an offset of the processing thread to a second of the three random numbers, and
  setting an order of the processing thread based on a third of the three random
 numbers, wherein the order indicates a direction of either ascending from the starting point or descending from the starting point,
 generates, with each of the two or more processing threads, a dynamic query, wherein a dynamic query generated by a processing thread of the two or more processing threads comprises an instruction to perform the database operation on rows of the database that are part of a number of rows of the database based on the offset of the processing thread and located in the direction indicated by the order of the processing thread starting at a row of the database indicated by the starting point of the processing thread, and
 runs each dynamic query against the database to perform the database operation; and
 terminates or resets a processing thread of the two or more processing threads after the processing thread finishes running its dynamic query against the database by performing the database operation on the rows of the database that are part of the number of rows of the database based on the offset of the processing thread and located in the direction indicated by the order of the processing thread starting at the row of the database indicated by the starting point of the processing thread.

9. The computer-implemented system of claim 8, wherein the database operation is idempotent.

10. The computer-implemented system of claim 8, wherein the processor further generates one or more additional processing threads by, for each processing thread of the one or more additional processing threads:
 generating three random numbers,
 setting a starting point of the processing thread to a first of the three random numbers,
 setting an offset of the processing thread to a second of the three random numbers, and
 setting an order of the processing thread based a third of the three random numbers.

11. The computer-implemented system of claim 8, wherein the second of the three random numbers is generated from a range of 1000 to 10000.

12. The computer-implemented system of claim 8, wherein the processer further resets a processing thread of the two or more processing threads when the database operation has been performed on all of the rows that are part of a number of rows of the database equal to the offset of the processing thread and in a direction indicated by the order of the processing thread starting at a row of the database indicated by the starting point of the processing thread, by:
 generating three additional random numbers;
 setting a new starting point of the processing thread to a first of the three additional random numbers,
  setting a new offset of the processing thread to a second of the three additional random numbers, and
  setting a new order of the processing thread to a third of the three additional random numbers.

13. The computer-implemented system of claim 8, wherein there are conditions on the database operation, and wherein the processor further:
 checks, with each of the two or more processing threads, rows of the database to determine if the rows of the database meet the conditions; and
 performs the database operation on rows that meet the conditions on the database operation.

14. The computer-implemented system of claim 8, wherein the database is not partitioned when the dynamic queries are run against the database.

15. A system comprising: one or more computers and one or more non-transitory storage devices storing instructions which are operable, when executed by the one or more computers, to cause the one or more computers to perform operations comprising: receiving an instruction to perform a database operation on rows of a database;
 generating two or more processing threads by, for each processing thread of the two or more processing threads:
  generating three random numbers,
  setting a starting point of the processing thread to a first of the three random numbers,
  setting an offset of the processing thread to a second of the three random numbers, and
  setting an order of the processing thread based on a third of the three random
 numbers wherein the order indicates a direction of either ascending from the starting point or descending from the starting point;
 generating, with each of the two or more processing threads, a dynamic query, wherein a dynamic query generated by a processing thread of the two or more processing threads comprises an instruction to perform the database operation on rows of the database that are part of a number of rows of the database based on the offset of the processing thread and located in the direction indicated by the order of the processing thread starting at a row of the database indicated by the starting point of the processing thread;
 running each dynamic query against the database to perform the database operation; and
 terminating or resetting a processing thread of the two or more processing threads after the processing thread finishes running its dynamic query against the database by performing the database operation on the rows of the database that are part of the number of rows of the database based on the offset of the processing thread and located in the direction indicated by the order of the processing thread starting at the row of the database indicated by the starting point of the processing thread.

16. The system of claim 15, wherein the one or more computers and one or more non-transitory storage devices further store instructions which are operable, when executed by the one or more computers, to cause the one or more computers to further perform operations comprising:

generating one or more additional processing threads by, for each processing thread of the one or more additional processing threads:

generating three random numbers, setting a starting point of the processing thread to a first of the three random numbers, setting an offset of the processing thread to a second of the three random numbers, and setting an order of the processing thread based a third of the three random numbers.

17. The system of claim 15, wherein the one or more computers and one or more non-transitory storage devices further store instructions which are operable, when executed by the one or more computers, to cause the one or more computers to further perform operations comprising:

resetting a processing thread of the two or more processing threads when the database operation has been performed on all of the rows that are part of a number of rows of the database equal to the offset of the processing thread and in a direction indicated by the order of the processing thread starting at a row of the database indicated by the starting point of the processing thread, wherein resetting the processing thread of the two or more processing threads comprises:

generating three additional random numbers;

setting a new starting point of the processing thread to a first of the three additional random numbers, setting a new offset of the processing thread to a second of the three additional random numbers, and setting a new order of the processing thread to a third of the three additional random numbers.

* * * * *